(No Model.) 3 Sheets—Sheet 1.

F. O. C. ZIMMERMANN & E. G. BEHREND.
GENERATING MOTIVE POWER.

No. 550,383. Patented Nov. 26, 1895.

Witnesses:
H. G. Dieterich
B. W. Sommers

Inventors:
Friedrich O. C. Zimmermann and
Elias G. Behrend.
by [signature] Atty.

(No Model.) 3 Sheets—Sheet 2.
F. O. C. ZIMMERMANN & E. G. BEHREND.
GENERATING MOTIVE POWER.
No. 550,383. Patented Nov. 26, 1895.
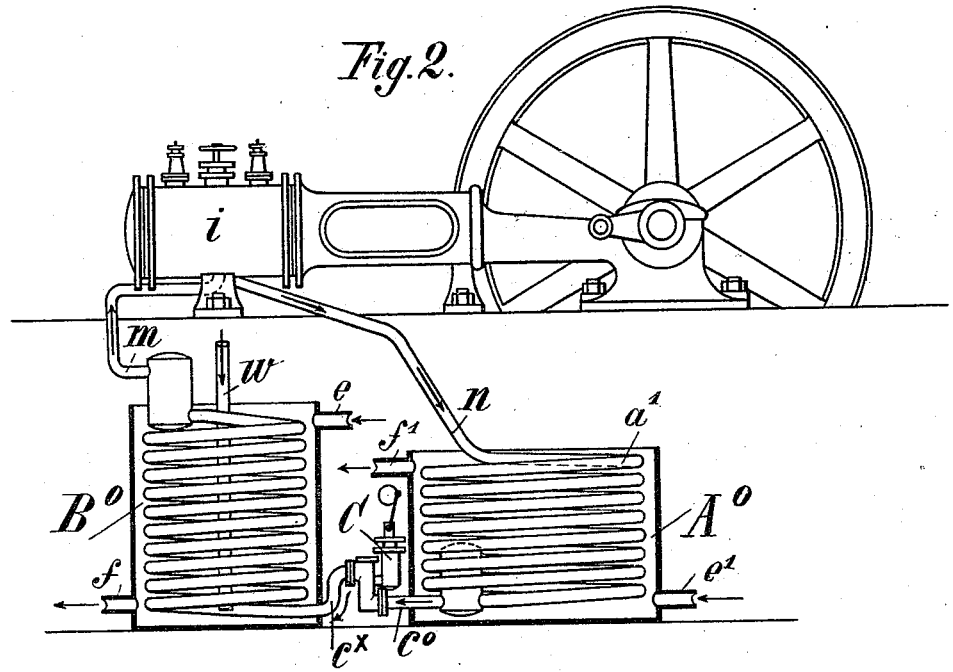
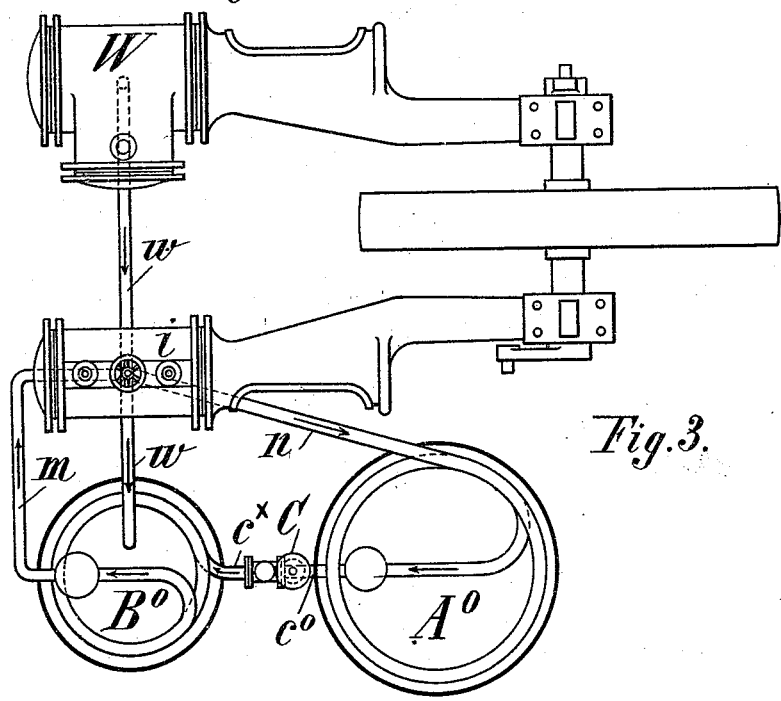
Witnesses:
H. G. Dieterich
B. W. Sommers
Inventors
Friedrich O. C. Zimmermann and
Elias G. Behrend
by [signature], Atty.

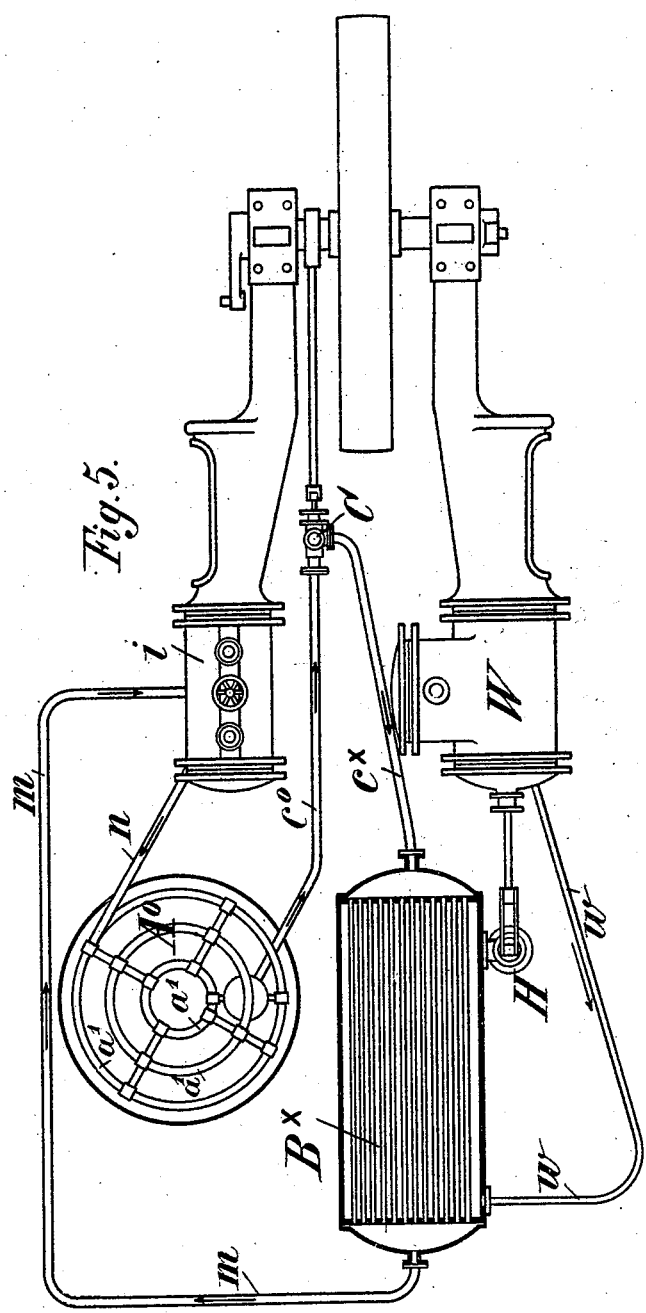

UNITED STATES PATENT OFFICE.

FRIEDRICH OTTO CORNELIUS ZIMMERMANN, OF LUDWIGSHAFEN, AND ELIAS GOTTLIEB BEHREND, OF HAMBURG, GERMANY.

GENERATING MOTIVE POWER.

SPECIFICATION forming part of Letters Patent No. 550,383, dated November 26, 1895.

Application filed January 21, 1892. Serial No. 418,832. (No model.)

*To all whom it may concern:*

Be it known that we, FRIEDRICH OTTO CORNELIUS ZIMMERMANN, doctor of philosophy, of Ludwigshafen, and ELIAS GOTTLIEB BEHREND, of Hamburg, in the German Empire, subjects of the German Emperor, have invented certain new and useful Improvements in Generating Motive Power, of which the following is a specification.

Our invention has for its object the provision of means whereby the efficiency of steam-engines may be materially increased and whereby said engines may be more economically operated, and this we attain by the combination with a steam-engine of a vapor-engine and by the use of a liquid that is vaporizable at normal temperature and whose vapors at such normal temperature possess considerable tension—as, for instance, anhydrous sulfurous acid, the boiling-point of which is $-10°$ centigrade, or anhydrous methyl-ether, the boiling-point of which is $-21°$ centigrade, or anhydrous ammonia, the boiling-point of which is $-39°$ centigrade, or carbonic acid, the boiling-point of which is $-78°$ centigrade. These liquids produce vapors at normal temperatures of considerable tension, those of sulfurous acid at $+15°$ centigrade being 2.7 atmospheres absolute and those of anhydrous ammonia 7.45 atmospheres absolute, so that even the vapors evolved from these liquids at normal temperatures can be converted into power.

The aim of this invention is to increase the tension of these vapors considerably above their tension at normal temperature by utilizing the latent heat in the exhaust-steam of a high-pressure steam-engine or that of the exhaust-steam employed in the production of a vacuum in condensing steam-engines. Our improved engine may, therefore, be truly called a "regenerative steam-engine."

In carrying out our invention we employ two independent engines of suitable construction, and by preference single-cylinder engines, whose piston-rods are preferably connected at an angle of ninety degrees with one and the same driving-shaft, as illustrated in the accompanying drawings, in which—

Figure 1:
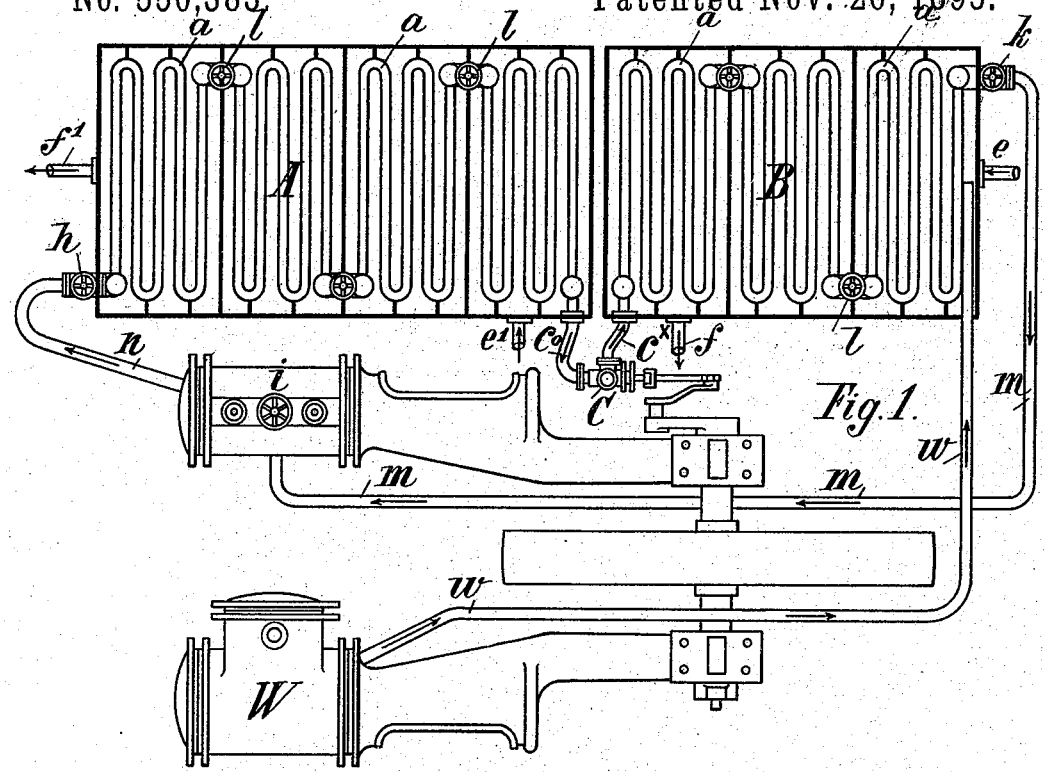
Figure 4:
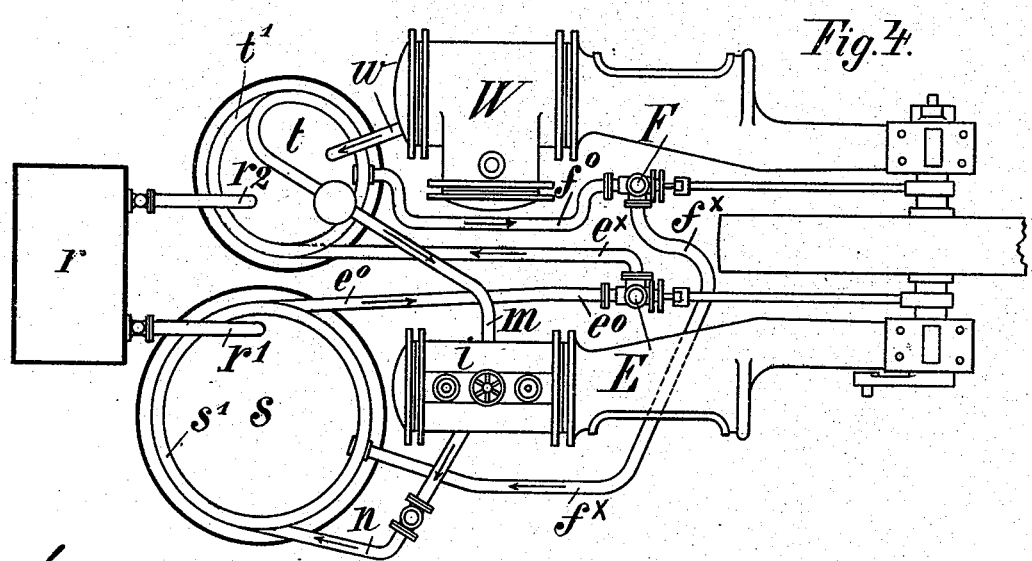

Figure 1 is a top plan view illustrating one mode of carrying out our invention, the regeneration of the exhaust-vapors from the vapor-engine being effected in a so-called "counter-current" condenser and evaporator of a construction substantially as described in our application for Letters Patent of the United States filed December 26, 1889, Serial No. 335,065. Fig. 2 is a side elevation, partly in section, of a binary engine, illustrating a modified construction and arrangement of condenser and vaporizer; and Fig. 3 is a top plan view thereof. Figs. 4 and 5 are top plan views illustrating further modifications in the construction and arrangement of the condenser and vaporizer, the vaporizer, Fig. 5, being shown in section.

Referring to Fig. 1, W indicates a steam-engine, and $i$ a vapor-engine, of any suitable or approved construction, and A and B indicate the condenser and vaporizer, respectively, each consisting of a suitable tank containing a coil or series of superposed interconnected coils $a$ and $a^2$, divided into sections by the interposition of check or back-pressure valves $l$. The coils $a$ and $a^2$ in tanks A B are immersed in water of normal temperature, kept in continuous motion, flowing into and out of tank B through pipes $e$ and $f$, respectively, and into and out of tank A through pipes $e'$ and $f'$, respectively. The exhaust of the vapor-engine $i$ is connected by pipe $n$ with the initial of coil $a$ in tank A, the terminal of which coil is connected with the suction-pipe $c°$ of pump C, that is operated from the driving-shaft driven by both engines. The initial of coil $a^2$ in tank B is connected with the force-pipe $c^\times$ of said pump C, while the terminal of said coil is connected with the admission of the vapor-engine $i$, while the exhaust of steam-engine W is connected by pipe $w$ with the vaporizer-tank B, said pipe discharging the exhaust-steam into the water in said tank at a point proximate to the water-inlet pipe $e$, as shown.

By means of the described arrangement the latent heat of the exhaust-steam is completely utilized by absorption in tank B, the water therein being thus sufficiently heated to vaporize the condensed exhaust products of the vapor-engine and produce vapors of sufficiently high tension to perform considerable work, thereby materially increasing the efficiency of the engine and correspondingly reducing the cost of operating the same. The flow of the exhaust-vapors, as will be seen, is in a direction the reverse of that of the water in both the condenser A and vaporizer B, so that in the former the condensation is a gradual one in view of the fact that the water is coolest at the point where the products of condensation are transferred from the condenser to the vaporizer. A gradual vaporization of the said products of condensation takes place in the vaporizer, the water in the tank being hottest at the point where the vapors are taken from the vaporizer-coil to be supplied to the vapor-engine under considerable tension.

The advantages derived from such an arrangement will be readily understood from the following: A theoretically perfect steam-engine is one in which all the heat can be transformed into work. Such an engine would, at an initial tension of thirteen atmospheres absolute per indicated horse-power, consume per hour 4.8 kilos of steam, or at an initial tension of seven atmospheres absolute 5.3 kilos, a final tension of $+60°$ centigrade $=0.2$ atmospheres being assumed. It is, however, well known that this cannot be attained with any engine as now constructed, in view of the loss of heat from various causes and the loss of pressure due to imperfect expansion. The loss of caloric, due to the cooling of the steam, varies, as is well known, from ten to thirty per cent. A well-constructed steam-engine, with a consumption of only 6.5 kilos steam per horse-power per hour, would therefore work with a useful effect of $\frac{4.8}{6.5}=74$ per cent. A good condensing-engine, with a consumption of ten kilos, would produce a useful effect of $\frac{4.8}{10}=48$ per cent., while a good high-pressure engine, with a consumption of twenty-five kilos of steam, would produce a useful effect of only $\frac{4.8}{25}=19$ per cent. In the engine referred to the loss of steam and heat varies, therefore, from twenty-six to eighty-one per cent. Inasmuch as a considerable amount of this lost heat is made available in our mproved binary engine whatever gain obtained should, therefore, be added to the useful effect produced. The net gain in each case can, therefore, be readily calculated by the well-known thermo-dynamical formula of efficiency, $$L \text{ (in calories)} = q' - q^2 + r\left(\frac{T_1 - T_2}{T_1}\right) - T_2 \times (\tau_1 - \tau_2),$$

in which, as is well known, $q$ indicates the heat of the liquid, $r$ the latent heat, $T$ the absolute temperature, and $\tau$ the heat weight of the vapor. The last quite insignificant term $A\sigma(p_1 - p_2)$ is omitted from the formula for the sake of facilitating the calculation, and would, if added, be in favor of the results. From this formula it results that if $\tau_2 = 0$—that is to say, if the expansion can be carried to $-273°$ centigrade—the effect $q+r$ will be equal to the total heat in the steam, so that it would be possible to transform the whole of the heat into work. If, therefore, we could place the condenser of the binary engine into the ether of the universe the engine would consume but a small quantity of steam, and the entire quantity of heat evolved from the fuel would be converted into work. This being, however, impossible, we provide means in our engine whereby a more complete utilization of the heat from the fuel used is effected by utilizing the exhaust-steam in the vaporization of a liquid of the nature above referred to.

After condensation the liquid is heated by the waste steam to 60° centigrade, the vapors performing work in the vapor-engine. The cooling of the exhaust-vapors to about 20° or at least 25° centigrade is readily effected in the condenser in view of the fact that we have not to deal with the production of a vacuum, which is the reason why in condensing steam-engines low temperatures cannot be obtained in the condenser. Inasmuch as work is performed by the vapors of such liquids as herein referred to at normal temperatures the cooling of such vapors becomes insignificant and a useful effect of eighty per cent. is readily obtainable. Thus a well-constructed steam-engine consuming 5.5 kilos of steam per horse-power per hour, if combined with a vapor-engine, as hereinbefore described, having a useful effect of seventy per cent. relatively to the work of the steam-engine, will give a result of 0.373 horse-power. In general, the effect with 5.5 kilos steam per horse-power per hour is $\frac{5.5}{1.373}=4.0$ kilos, so that a saving of 37.3 per cent. is effected by the combination of the two engines, the calculation showing that a better result can be obtained by the combination of the two engines than can be obtained with a theoretically-perfect steam-engine, taking into consideration the useful effect of eighty per cent. within the limits of temperature fixed for the latter engine. The theoretically-perfect engine would consume within these limits of temperature 190°−20° centigrade only 3.68 kilos, while our engine will work with a useful effect of $\frac{3.68}{4}=92$ per cent. This high percentage is due to the fact that the 1.82 kilos steam (5.5−3.68=1.82 kilos) which is wasted in the steam-engine is utilized in our binary engine in the performance of work—namely, in the vaporization of the volatile liquid, such results having been obtained in some experiments made, yet it is not claimed that in practice such results can be obtained as a rule.

Take as an example an engine such as that of the fast steamer *Prince Bismarck* which when combined with a vapor-engine has shown a profit of 46.4 per cent. With a consumption of 6.6 kilos of steam per horse-power per hour $\frac{6.6}{1.404}=4.5$ kilos, $=46.4$ per cent. saving.

A condensing steam-engine consuming ten kilos steam and working under seven atmospheres absolute or with an initial temperature of 165° centigrade when combined with a vapor-engine will show a net gain of 1.730 horse-power or per horse-power per hour $\frac{10}{1.736}=5.7$ kilos, a gain of 73.6 per cent.

A high-pressure engine consuming twenty-five kilos steam when combined with a vapor-engine will show a net gain of 3.64 horse-power or per horse-power per hour $\frac{25}{3.64}=6.9$ kilos.

In view of the above it is evident that by means of our invention an imperfect steam-engine may be worked economically, while the percentage of heat converted into work in more perfect engines may be materially increased. In the four examples given above the consumption of steam increases in the ratio of $5.5:6.6::10:25$ kilos, while when combined with the vapor-engine in accordance with our invention the increase is only of $4:4.5::5.7:6.9$. The disproportionately increasing gain shown is due solely to the utilization of the heat of the steam that passes uselessly through the steam-engine, which accounts for the increasing profit when greater quantities of steam are used.

The means for increasing the tension of the vapors of the anhydrous liquid or for condensing and vaporizing the exhaust-vapors from the vapor-engine $i$ may be variously modified.

In Figs. 2 and 3 we have illustrated both the condenser A° and evaporator B° as provided with an ordinary coil of pipe $a°$ and $b°$, respectively, C indicating the pump connected with said coils by pipes $c°$ $c^\times$ and arranged to pump the condensate from $a°$ into $b°$, and $n$ and $m$ indicating the pipes that connect said coils, respectively, with the exhaust and admission of the vapor-engine, $e'$ $f'$ the water inlet and outlet pipes for the condenser-tank, $e$ and $f$ the corresponding pipes for the vaporizer, and $w$ the exhaust-pipe of the steam-engine W.

In Fig. 4 $r$ indicates a water-reservoir for supplying water to the absorber and evaporator tanks $s$ and $t$ through valved pipes $r'$ and $r^2$, the condenser-coil being here replaced by an absorption-coil $s'$, containing a liquid, as water, capable of absorbing the exhaust-vapors, a pump E transferring the solution from said coil into the evaporator-coil $t'$, in which the absorbed vapor is distilled off and flows to the admission of the vapor-engine by pipe $m$, the water in the tank $t$ being heated by the exhaust-steam from pipe $w$ dipping into said tank $t$. A second pump F, connected with the vaporizer-coil $t'$ through pipe $f°$, conveys the absorption liquid back to coil $s'$ through pipe $f^\times$.

In Fig. 5 we have shown a multitubular evaporator B$^\times$ so arranged that the condensing of the exhaust-steam supplied thereto through pipe $w$ also influences the piston of the steam-engine by producing a partial vacuum in the evaporator-shell, the steam acting directly as heating medium for the evaporator-tubes instead of heating water, as in the construction described in reference to Figs. 1 to 4, H indicating the air-pump connected with the evaporator for producing the necessary vacuum therein. The condenser A° may also be provided with a series of concentrically-arranged interconnected condensing-coils $a'$, as shown, C being the pump that conveys the condensate to the evaporator by pipes $c°$ and $c^\times$, while $n$ indicates the exhaust-pipe for the vapor-motor connected with coils $a'$.

Having thus described our invention, what we claim as new therein, and desire to secure by Letters Patent, is—

1. The combination with a steam engine, a vapor engine, a condenser and a vaporizer connected together through one of their terminals, pipes connecting the other terminals thereof respectively with the exhaust and admission of the vapor engine, a pipe connecting the exhaust of the steam engine with the vaporizer tank, and means for inducing a flow of water through both the condenser and vaporizer tanks in a direction opposite to the flow of fluid through the coils or tubes therein, substantially as and for the purpose set forth.

2. The combination with a steam engine, a vapor engine, a condenser, a vaporizer, means for inducing a flow of water through both in one direction, a pipe connection between one of the terminals of the condenser and vaporizer, and a pump interposed in said connection, of pipes connecting the other terminal of the condenser and vaporizer respectively with the exhaust and admission of the vapor engine so as to cause the fluid from and to said engine to flow through said condenser and vaporizer in a direction opposite to the flow of water therethrough, and a pipe connecting the exhaust of the steam engine with the vaporizer tank near the water inlet thereof, substantially as and for the purpose set forth.

3. The combination with a steam engine, a vapor engine, a condenser and a vaporizer, each composed of groups of tubes, a check valve interposed between such groups, means for inducing a flow of water about said tubes, and a connection between one of the terminals of the condenser tubes and one of the terminals of the vaporizer tubes, of pipes connecting the other terminals of said condenser and vaporizer tubes respectively with the exhaust and admission of the vapor engine, and a pipe connecting the exhaust of the steam engine with the vaporizer tank, substantially as and for the purpose set forth.

In testimony that we claim the foregoing as our invention we have signed our names, in presence of two witnesses, this 3d day of December, 1891.

FRIEDRICH OTTO CORNELIUS ZIMMERMANN.
ELIAS GOTTLIEB BEHREND.

Witnesses as to FRIEDRICH OTTO CORNELIUS ZIMMERMANN:
C. A. SLABINEITINGL,
G. SIEBERT.

Witnesses as to ELIAS GOTTLIEB BEHREND:
ALEXADER SPECHT,
DIEDRICH PETERSEN.